United States Patent [19]

Brady et al.

[11] Patent Number: 5,808,607
[45] Date of Patent: Sep. 15, 1998

[54] MULTI-NODE MEDIA SERVER THAT PROVIDES VIDEO TO A PLURALITY OF TERMINALS FROM A SINGLE BUFFER WHEN VIDEO REQUESTS ARE CLOSE IN TIME

[75] Inventors: James Thomas Brady, San Jose; Linda Marie Duyanovich, Saratoga; Boris Klots, Palo Alto, all of Calif.

[73] Assignee: International Business Machines Corporation, Armonk, N.Y.

[21] Appl. No.: 418,542

[22] Filed: Apr. 7, 1995

[51] Int. Cl.⁶ ........................................... H04N 7/14
[52] U.S. Cl. .......................... 345/327; 348/7; 348/12; 455/4.2; 455/5.1; 395/200.49
[58] Field of Search ............... 348/6, 7, 12, 13, 348/10; 455/3.1, 4.1, 4.2, 5.1, 6.1, 6.2; 395/200.47, 200.48, 200.49; 345/326, 327; H04N 7/10, 7/14, 7/173

[56] References Cited

U.S. PATENT DOCUMENTS

| | | | |
|---|---|---|---|
| 4,518,989 | 5/1985 | Yabiki et al. | 358/86 |
| 4,538,176 | 8/1985 | Nakajima et al. | 358/86 |
| 4,734,765 | 3/1988 | Okada et al. | 358/102 |
| 4,816,905 | 3/1989 | Tweedy et al. | 358/86 |
| 4,941,040 | 7/1990 | Pocock et al. | 358/86 |
| 5,093,718 | 3/1992 | Hoarty et al. | 358/84 |
| 5,130,792 | 7/1992 | Tindell et al. | 358/85 |

(List continued on next page.)

FOREIGN PATENT DOCUMENTS

| | | | |
|---|---|---|---|
| 0625857A1 | 11/1994 | European Pat. Off. | H04N 7/173 |
| 0633694A1 | 1/1995 | European Pat. Off. | H04N 7/173 |
| WO91/03112 | 3/1991 | WIPO | H04H 1/00 |

OTHER PUBLICATIONS

"Disk Scheduling in a Multimedia I/O System", A. Reddy et al., ACM Multimedia Jun. 1993, CA, pp. 225–233.

"I/O Issues in a Multimedia System", A. Reddy et al., Computer, Mar. 1994, pp. 69–74.

"Grouped Sweeping Scheduling for DASD-Based Multimedia Storage Management", P. Yu et al., Multimedia Systems (1993), pp. 99–109.

"Support for Fully Interactive Playout in a Disk-Array-Based Video Server", M. Chen et al., IBM Research Division, T.J. Watson Research Center, Yorktown Heights, NY 10598.

(List continued on next page.)

Primary Examiner—Andrew I. Faile
Assistant Examiner—John W. Miller
Attorney, Agent, or Firm—Ohlandt, Greeley, Ruggiero & Perle

[57] ABSTRACT

A multi-node video server system in accordance with the invention comprises disk storage associated with a first node which stores at least a portion of a video presentation in the form of plural data blocks, each data block comprising a viewing time segment of the presentation. RAM buffer in a second node receives and stores data blocks of the video presentation from the disk storage in the first node, upon an initial request by a first viewing terminal to view a portion of the video presentation. A communication module in the second node outputs the data blocks, as an isochronous data stream, to requesting terminals. A host controller is coupled to the video server nodes and receives requests from viewing terminals for the video presentation. The host controller causes the communication module in the second node to connect to a viewing terminal which renders the initial request. Additional viewing terminals requesting the same video presentation are also connected to the same communication module if their requests are received within a time period from the initial request that does not exceed a sum of viewing time segments represented by data blocks stored in the RAM buffer. In this manner, both the first requester and subsequent requesting viewing terminals are enabled to receive the audiovisual presentation directly from the same buffer without requiring additional disk accesses for the subsequent viewers. Avoidance of additional internal video server communications is thus achieved.

5 Claims, 6 Drawing Sheets

U.S. PATENT DOCUMENTS

| | | | |
|---|---|---|---|
| 5,133,079 | 7/1992 | Ballantyne et al. | 455/4.1 |
| 5,172,413 | 12/1992 | Bradley et al. | 380/20 |
| 5,319,455 | 6/1994 | Hoarty et al. | 348/7 |
| 5,341,474 | 8/1994 | Gelman et al. | 395/200 |
| 5,371,532 | 12/1994 | Gelman et al. | 348/7 |
| 5,442,389 | 8/1995 | Blahut et al. | 348/7 |
| 5,453,779 | 9/1995 | Dan et al. | 348/7 |
| 5,512,934 | 4/1996 | Kochanski | 348/7 |
| 5,515,511 | 5/1996 | Nguyen et al. | 395/200.2 |
| 5,539,449 | 7/1996 | Blahut et al. | 348/7 |
| 5,544,327 | 8/1996 | Dan et al. | 395/250 |
| 5,559,999 | 9/1996 | Maturi et al. | 395/550 |
| 5,568,181 | 10/1996 | Greenwood et al. | 348/7 |
| 5,583,561 | 12/1996 | Baker et al. | 348/7 |

OTHER PUBLICATIONS

"Handling Audio and Video Streams in a Distributed Environment", A. Jones et al., ACM, Aug. 1993, pp. 231–243.

"Look–Ahead Scheduling to Support Pause–Resume for Video–on–Demand Applications", P. Yu et al., IBM Research Division, T.J. Watson Research Center, Yorktown Heights, NY 10598.

| MOVIE | SEGMENT | ORIGINATING NODE |
|---|---|---|
| ⋮ | ⋮ | ⋮ |

FIG. 2A (EACH NODE)

| MOVIE | SEGMENT | DISK/RAM | (LOCATION) NODE/ADDRESS |
|---|---|---|---|
| ⋮ | ⋮ | ⋮ | ⋮ |

FIG. 2B (ORIGINATING NODE)

| MOVIE | SEGMENT | IN/NOT IN | POINTER TO ADDRESS |
|---|---|---|---|
| ⋮ | ⋮ | ⋮ | ⋮ |

FIG. 2C (DELIVERING NODE)

FIG. 2D
<u>CURRENT STATE DATA</u>
— MOVIE/NODE ASSIGNMENTS
— MODE LOADING/# OF VIEWERS
— ORIGINATING NODES/MOVIE SEGMENTS
— MOVIE START TIMES

MULTI-NODE MEDIA SERVER THAT PROVIDES VIDEO TO A PLURALITY OF TERMINALS FROM A SINGLE BUFFER WHEN VIDEO REQUESTS ARE CLOSE IN TIME

FIELD OF THE INVENTION

This invention relates to a system for delivery of multi-media data and, more particularly, to an interactive video server system that provides video presentations simultaneously to a plurality of terminals while minimizing internal data communications within the system.

BACKGROUND OF THE INVENTION

Traditional methods for delivery of multi-media data fall into two categories: (1) broadcast industry methods and (2) computer industry methods. Broadcast methods (including motion picture, cable, television networks and record industries) generally provide storage in the form of analog or digitally recorded tape. The playing of a tape causes an isochronous data stream to be generated which is then moved through broadcast industry equipment to the end user. An isochronous data stream is one in which the data is supplied in a continuous and synchronous manner so as to enable presentation at the receiving end of a continuous presentation.

Computer methods generally provide video storage in the form of disks or disks augmented with tape and record data in compressed digital format. On request, the computer delivers a non-isochronous data stream to the end user, where hardware buffers and special application codes smooth the data stream to enable continuous viewing or listening.

With the introduction of compression techniques that enable computers to store video material in digital format, a revolution has begun in both television broadcasting and movie studio production. Both now offer "video on demand" over telephone lines, pay per view movies in hotels, etc. Compression technology has progressed to the point where acceptable results can be achieved with compression ratios of 100x to 180x. Such compression ratios make random access disk technology an attractive alternative to prior art tape systems.

Video server design approaches take advantage of the characteristics of audiovisual presentations which generally involve long uninterrupted data streams. Video servers are also designed to serve any user attached to the network. In such an environment, the key resources in the video server application are disk bandwidth, interconnect bandwidth and buffer capacity. Due to the very long service time of the video transaction (averaging 110 minutes for a movie), the transaction response time of the video server is not important. It is key, however, that the system guarantee isochronous data transfer.

In a video server, the cost of service is determined by how the bandwidth is applied to support multiple simultaneous viewers of the video material. A single disk can simultaneously support approximately sixteen movies compiled using MPEG standards. When the number of disks required to contain the video material is not sufficient to handle the number of viewers, random access memory (i.e. dram) can be used to augment the system's storage capacity. However, this increases the cost of the video server by more than an order of magnitude. In prior art systems, each video stream causes generation of a separate stream of disk accesses to the disk subsystem. Efforts have been directed at various disk scheduling techniques to avoid the imposition of large ram buffer memory systems.

Accordingly, it is an object of this invention to provide a video server system which reduces the number of disks required to service a large number of users.

It is a further object of this invention to provide a video server system wherein reduced buffer memory is enabled to service multiple viewers requesting access to frequently viewed video presentations.

It is still another object of this invention to provide an improved video server system wherein viewer scheduling enables a reduction in internal video server communications.

SUMMARY OF THE INVENTION

A video on demand video server system enables a viewer to log on to the system and to request a movie from among those available. The video server system is capable of supplying hundreds of movies. The movies are principally stored on disk and are supplied as a compressed video stream, via random access memory (RAM) buffers to requesting users. Throughout the system, the video stream travels in compressed format and is decompressed via a set-top decoder attached to the viewers' television.

A multi-node video server system in accordance with the invention comprises disk storage associated with a first node which stores at least a portion of a video presentation in the form of plural data blocks, each data block comprising a viewing time segment of the presentation. RAM buffer in a second node receives and stores data blocks of the video presentation from the disk storage in the first node, upon an initial request by a first viewing terminal to view a portion of the video presentation. A communication module in the second node outputs the data blocks, as an isochronous data stream, to requesting terminals. A host controller is coupled to the video server nodes and receives requests from viewing terminals for the video presentation. The host controller causes the communication module in the second node to connect to a viewing terminal which renders the initial request. Additional viewing terminals requesting the same video presentation are also connected to the same communication module if their requests are received within a time period from the initial request that does not exceed a sum of viewing time segments represented by data blocks stored in the RAM buffer. In this manner, both the first requestor and subsequent requesting viewing terminals are enabled to receive the audiovisual presentation directly from the same buffer without requiring additional disk accesses for the subsequent viewers. Avoidance of additional internal video server communications is thus achieved.

BRIEF DESCRIPTION OF THE DRAWINGS

FIG. 2A illustrates a table maintained in each node of the video server of FIG. 1.

FIG. 2B represents a table maintained by an originating node wherein a video presentation is maintained on disk.

FIG. 2C represents a table maintained in a delivering node which is providing an isochronous data flow to a viewing terminal.

FIG. 2D is a list of data maintained by the host processor to enable control of the system of FIG. 1.

DETAILED DESCRIPTION OF THE INVENTION

In the following description, a number of terms are used that are defined below:

ATM: asynchronous transfer mode; a high speed switching and transport technology that can be used in local and wide-area networks. It is designed to carry both data and video/audio.

DASD: direct access storage device; any on-line data storage device or CD-ROM player that can be addressed is a DASD. Used synonymously with magnetic disk drive.

Delivering node: a node which delivers data blocks comprising a time segment of an audiovisual presentation from resident RAM buffer via a communication module and communication network to a viewing terminal.

Isochronous: used to describe information that is time sensitive and that is sent (preferably) without interruption. Video and audio data sent in real time are isochronous.

MPEG: Moving Picture Experts Group; a working committee under the auspices of the International Standards Organization that defines standards for digital compression/decompression for motion video/audio. MPEG-1 is the initial standard and is in use. MPEG-2 will be the next standard and will support digital video transport.

Originating node: a node which stores a segment of an audiovisual presentation on resident DASD and maintains a table indicating where data blocks comprising the segment can be found on other nodes.

RAID: Redundant Array of Inexpensive Disks; a storage arrangement that uses several magnetic or optical disks, working in tandem, to increase bandwidth output and provide redundant backup.

Figure 1:
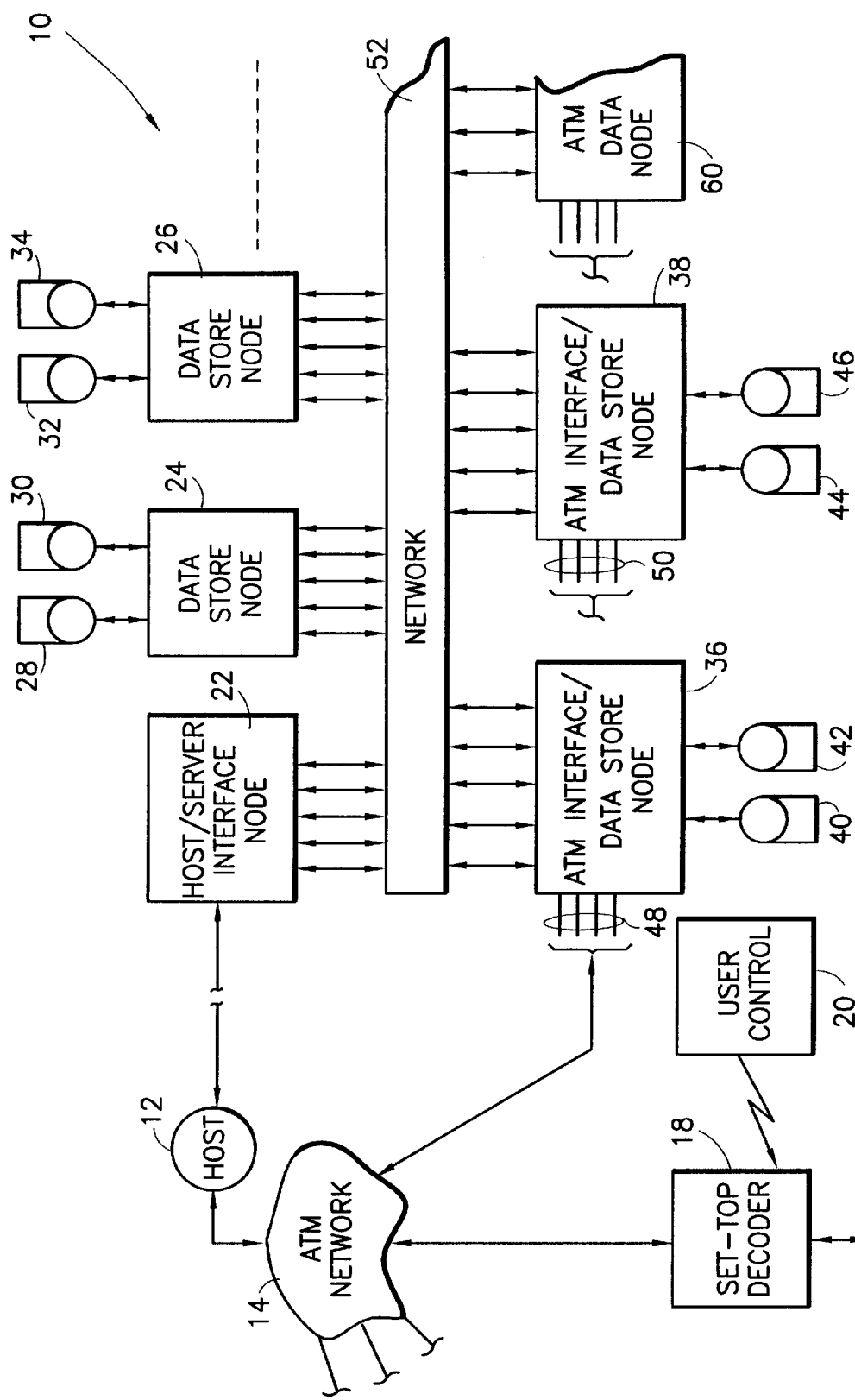
FIG. 1 is a block diagram of a system which incorporates a video server embodying the invention.

Referring to FIG. 1, video server 10 is connected via a host processor 12 and ATM network 14 to a plurality of viewing terminals 16 via set-top decoders 18. Each set-top decoder is controlled by a user's actuation of a handheld control 20. Only one viewing terminal 16 is shown but it is to be understood that video server 10 is capable of providing concurrent video streams to thousands of such viewing terminals. Further, video server 10 may be connected to plural host processors 12, each of which is couple-able to hundreds/thousands of receiving terminals. Hereafter it will be assumed that only one host processor 12 is coupled to video server 10.

Host processor 12 interfaces with video server 10 via a host/server interface node 22. Video server 10 comprises at least two types of nodes, both of which are constructed along common architectural lines. Data store nodes 24 and 26 provide mass storage on DASD 28, 30 and 32, 34 respectively. ATM interface/data storing nodes 36 and 38 (hereafter called "combination" nodes also provide interface functions for connected DASD 40, 42 and 44, 46, respectively and further provide communication interfaces with ATM network 14, via communication lines 48 and 50. Each data store node and combination node includes RAM memory for buffering of audiovisual segments. To balance work among the nodes, audiovisual presentations are broken up into time segments (e.g. 5 minutes segments) comprising multiple data blocks. Each time segment is stored on a separate disk drive, preferably in a RAID fashion, across plural nodes so that all nodes have work substantially equally distributed amongst them.

A node whose DASD stores a segment is designated as an "originating" node and is the "owner" of the segment. As shown in FIG. 2B, an originating node maintains a table which identifies the audiovisual presentation (hereinafter referred to as "movie") the stored segment of the movie, its current location (by node) and whether it is on disk or RAM in the storing node. A node which is delivering a segment of a movie is called a "delivering" node and maintains the table shown in FIG. 2C wherein is listed the movie, the time segment, an "in-node"/"not-in-node" indicator, and a pointer to the address of data blocks comprising the time segment. All nodes, whether originating or delivering nodes, further include a table which identifies for each movie and time segment, its assigned originating node (see FIG. 2A).

Each node in video server 10 comprises, for example, five input/output communication links which enable each node to directly connect, via a network 52, to five physically adjacent nodes. As will become apparent, switching control within video server 10 is distributed among the nodes and network 52 merely comprises a wiring mesh which enables each communication link in a node to connect to a communication link in an adjacent node. Each combination node further includes, in this example, four input/output ATM communication lines over which video streams are supplied to ATM network 14.

A number of tables are maintained to enable interface and scheduling functions for video server 10. Such tables are preferably distributed among the individual nodes and are periodically updated. If plural host processors are connected to video server 10, each host processor, in response to a user request, will request status information via an interface node which, in response will assemble and report the status data and report it to the inquiring host processor. If only one host processor 12 is connected, the status data may be maintained in the host processor. Assuming the latter case, host processor 12 maintains a number of tables to enable node assignment and scheduling functions. A first table (see FIG. 2D) maintains track of which movie and time segments are assigned to which nodes (i.e. delivering nodes). A second table keeps track of node loading in terms of numbers of viewers presently receiving video streams from each node. A third table maintains a list of originating nodes and time segments assigned thereto. A fourth table maintains track of movie start times. The use of each of the aforesaid tables, in enabling control of video server 10, will become apparent from the description below.

Host processor 10 initially makes a tentative prospective assignment of movies to nodes. Subsequently, host processor 12 provides real-time assignment of viewers to node ports upon receiving requests to view movies. Initially, host processor 10 estimates the usage that each movie will receive. That estimate may be based upon usage during a previous corresponding time or may be based upon some other expectation. The estimate is dynamically updated by host processor 12, based upon actual usage. In accordance with the estimate, host processor 12 assigns one or more nodes to service the most frequently requested movies.

The number of nodes required to support each movie is calculated by dividing the estimated number of viewers by the number of viewers a node can support. Then, starting with the highest usage movie, movies are assigned to nodes that are electrically close (e.g. physically or geographically close). If it occurs that there are insufficient nodes to enable complete assignment of all movies, the lesser-requested movies remain unassigned, pending receipt of an actual viewing request. As will become apparent, infrequently viewed movies require more buffering capacity than frequently viewed movies, so an assignment of an infrequently viewed movie may be modified to cluster infrequently viewed movies on nodes with larger numbers of buffers.

As viewers request tentatively assigned movies, host processor 12 causes a node assigned to a movie to service the viewing request until the node reaches its output capacity. At such time, host processor 12 increments to a next node that has been assigned to that same movie. Viewers are assigned, based upon a common temporal interest in a specific movie and for the duration of the movie. Thus, if a time segment of a movie already resides in RAM buffer in a node, that time segment is substantially immediately available for viewing. Further, all portions of that time segment are substantially simultaneously available. Thus, if a first viewer requests a movie and a first time segment is placed in a node's RAM buffer, then all succeeding viewers (up to the node's capacity) who request that same movie and render the request within the time duration of the first request for the first time segment may also be supplied, in parallel, from the first time segment that already resides in buffer memory. In this manner, temporally close requests are grouped so as to enable all viewers in the group to be serviced in parallel and directly from the time segment in buffer memory. Plural buffers are generally provided to enable multiple data blocks of a time segment to be stored and immediately available for output.

When a time segment is buffered for the first time in a delivering node, the delivering node provides an indication of such buffering back to the originating node so as to enable the table in the originating node to be updated as to the status of the movie segment which the originating node "owns". When a node needs a time segment of a movie, it will query its nodal table to find the identity of the originating node for the desired time segment. It will then query the originating node and request supply of the desired time segment. Upon so doing, the delivering node then causes the table in the originating node to be updated to reflect the new status of the time segment.

As indicated above, viewers are assigned, based upon a common temporal interest in a movie. A first viewer causes an initial time segment of the requested movie to be accessed from DASD in a node where it presently resides. The first viewer is initially allocated several buffers in the node and an additional buffer each time a data block (or blocks) is finished. The number of buffers allocated to a viewer provides a tradeoff between disk segment bandwidth and RAM capacity. Thus, with greater RAM capacity, less input/output DASD operations are required thereby conserving disk system bandwidth. A subsequent viewer uses the buffers allocated to the first viewer if the time delay between the first and subsequent viewer requests allows the subsequent viewer to access the time segment of the requested movie while it is still within the buffer(s) allocated to the first viewer.

A buffer is reclaimed from a movie when a node has need for the buffer space and the buffer is not servicing or is not scheduled to service a viewer.

Hereafter, several examples will be given indicating the operation of video server 10 in response to one or more viewer requests for a movie. Thereafter, a detailed description will be provided of components within each node which enable operation of the invention.

Assume initially that video system 10 (FIG. 1) is operating but that there are no viewers watching a movie. Assume further that an initial user operates user control 20 and causes set-top decoder 18 to signal ATM network 14 to contact host processor 12. Set-top decoder 18 enables the identity of a requested movie to be passed to host processor 12 via ATM network 14. Host processor 12, in response, assembles status information regarding video system 10 to determine which node has available bandwidth for delivery of a movie to a viewer.

As indicated above, host processor 12 has already established a tentative assignment of nodes to the movies. Since each node has the capability to directly connect to up to five electrically adjacent nodes, the tentative assignment is constructed to assure that each of the preassigned nodes for a movie is one link distant from another node in the assignment sequence. Since, in this case, no viewers are watching the movie, a first node in the assignment queue is chosen (assume node 36) and it is designated to supply the movie to the first requesting viewer.

Host processor 12 further determines if a transmission channel exists in ATM network 14 to enable delivery of the movie. If ATM network 14 responds positively, host processor 12 then reserves the communication path within ATM network 14 and informs node 36 that it is to deliver the movie. In response, node 36, via its node table (see FIG. 2A) determines the originating node for the movie (assume that the originating node is node 24). Node 36 then allocates buffers to receive data block(s) comprising a portion of the first time segment from node 24 and requests delivery of the first data blocks from node 24 to the pre-allocated buffer store. Upon receiving the first data blocks(s), node 36 sends a message to node 24 causing update of the originating node's table (see FIG. 2B) to indicate where the initial data block(s) are positioned within node 36. Simultaneously, node 36 commences delivery of the initial data block(s) via ATM network 14 to set-top decoder 18 and TV 16. Host processor 12 now records the movie start time and is made aware of the amount of buffer allocated by node 36 to store the initial data block(s) of the movie segment.

To provide the initial data block(s) to node 36, node 24 accesses a DASD (e.g. 28) where the initial time segment is stored, caches the initial data block(s) thereof and delivers it (them) to buffer in node 36. Node 24 also commits to supply additional time segments to node 36 and queues the additional data blocks of the segment to await a next request from node 36. Node 36 now transmits the first data block(s) of the movie from its resident buffer in a pipeline manner the over the ATM allocated communication channel. Node 36 further allocates a second buffer to receive the second data block(s) from node 24. If the movie is required for only a single viewer, then only two buffers are allocated and are sequenced, one after the other.

Assume now that host processor 12 receives a second request to view the same movie. Since host processor 12, from assembled status information, knows the movie start time and the loading level of node 36 (in terms of available output capacity), host processor 12 is able to determine (1) whether node 36 is able to deliver another copy of the movie to the second requester and (2) whether the time duration between the movie start time and the second request is such as to enable the second request to be fulfilled from the movie's data block(s) buffered in node 36. If the answer to both questions is yes, host processor 12 determines that both the first viewer and second viewer are part of a "group"

which is to be served by node 36 from the movie's data block(s) buffered therein.

Host processor 12 then determines from ATM network 14 that there is a channel available to satisfy the second request and, upon reserving such a channel, provides a message to node 36 to commence supplying the movie to the second requester. Since the first time block(s) reside in buffer store within node 36, node 36 commences providing the initial data block of the segment directly from the buffered data block(s), while simultaneously providing the first requester data that is later in the same data block(s).

As additional requests are received by host processor 12 for the movie, a determination is made as to whether the subsequent requests are sufficiently close in time to the first request to enable them to be serviced from the data block(s) resident in buffer in node 36. If yes, and node 36 still retains capacity to supply the additional requesters, the additional requests are assigned to the "group" and the procedure repeats as above indicated. However, if subsequent viewer requests are substantially delayed so that the available buffer space in node 36 is insufficient to encompass temporal data blocks to service the additional requesting viewers, the "group" is closed and host processor 12 commences a second group. In such case, node 38 would be assigned to handle the second group in the same manner as above described.

If host processor 12 receives a large number of requests for a movie within a short temporal period, it may occur that node 36 reaches its I/O capacity to handle messages to and from ATM network 14. Under such conditions, when a next viewer request is received which exceeds the capacity of node 36, host processor 12 sees that node 36 is at capacity and examines the node assignment schedule. Assuming that node 38 is the next node on the assignment schedule, host processor 12 instructs node 38 to deliver the movie to the latest requesting viewer. Node 38 responds by sending a message to node 24 (the originating node) asking where the first data blocks of the initial movie segment are stored. Node 24 responds that the first data block is buffered in node 36. Since nodes 36 and 38 are one link apart, in accordance with the predetermined assignment schedule, node 38 accesses the first data block from node 36. Node 38, upon receiving the first data block of the movie segment, buffers the initial data block and pipelines the data therein over ATM network 14 to the requesting viewer.

At the end of the first data block(s), node 38 again accesses node 24 and asks for an identification of where the second data block(s) of the time segment are stored. Again, the response from node 24 is that the second data block(s) resides in node 36. Node 38 then accesses the second data block(s) from node 36 and the operation commences as aforedescribed. Thus, node 36 is the only node which causes node 24 to access data blocks from DASD 28 and to transfer those data blocks via network 52 to node 36. Otherwise, nodes requiring data blocks of the movie segment, acquire those blocks from node(s) wherein they are already buffered.

As node 38 accesses data blocks from node 36, node 38 provides messages to node 24 identifying the storage locations of the data blocks. Thus, the originating node table within node 24 is always updated and manifests the latest location of all data blocks for which node 24 is an originating node. In this manner, each succeeding node assignment that occurs (after a preceding node in the assignment chain has been filled) is immediately able to access the relevant data blocks from the immediately preceding node where the data block is buffered—rather than having to traverse network 52 back to node 24.

In certain instances, the predetermined node assignment schedule will be overwhelmed by the number of requesting viewers. In such case, host processor 12 assigns additional nodes which may not be electrically adjacent to the immediately preceding node in the assignment chain. However, the newly assigned node will always know which node to go to determine where to find the time segment of the movie (as its table will always contain an identification of the originating node for the particular movie time segment).

At the other extreme, a "group" may consist of just a single or several viewers. In such case, host processor 12 responds to a further viewing request by assigning the further request to the node servicing the group (e.g. node 60). Node 60 allocates two buffers for succeeding data blocks of the movie segment and commences supplying the movie segment after accessing the initial data block(s) from the originating node. If at the end of the second data blocks, no additional viewer requests have been received and assuming that system usage is low, node 60 may allocate still additional buffers, while retaining the initial and subsequent data blocks in the first and second buffers. This action continues until the buffer pool in node 60 is exhausted and allows a subsequent viewer to be serviced directly from the data blocks stored in buffer node 60 (assuming the request is received prior to the time that the buffer supply is exhausted). Such operation enables the building of a "group" while minimizing the amount of bandwidth required in the network to service the additional viewers. When the buffer pool is exhausted, node 60 then frees all buffers and reverts to the dual buffer operation that has been above described.

Turning now FIGS. 3–6, details of a representative node will be described.

Figure 3:
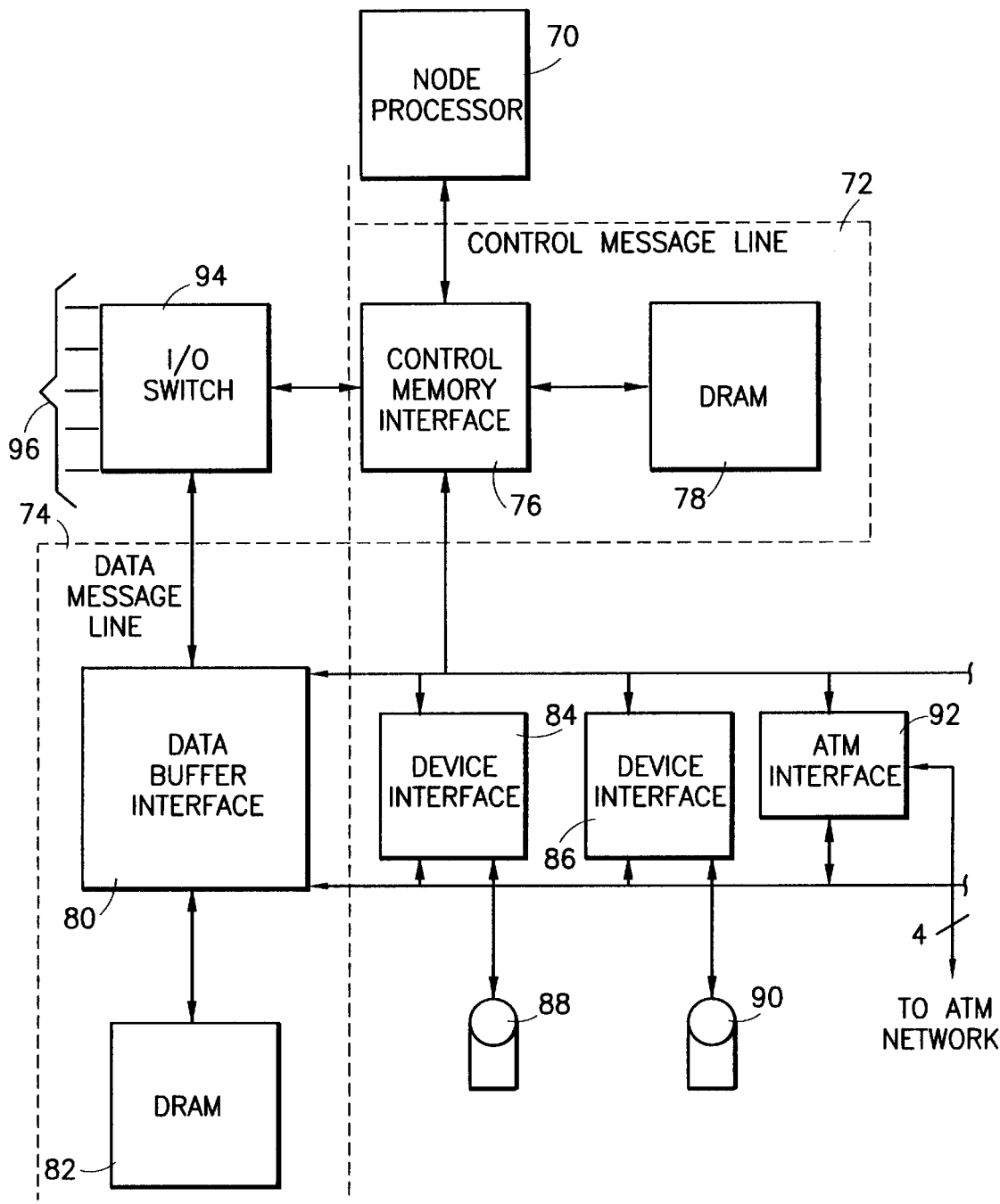
FIG. 3 is a detailed block diagram illustrating the overall architecture of an exemplary node in the video server of FIG. 1.

Each of the nodes shown in FIG. 1 is configured from a common node architecture shown in FIG. 3. Each node includes a node processor 70 that controls the overall functions of a node. Each node further includes a control message line 72 for receiving, storing and dispatching control messages and a data message line 74 for receiving, storing and dispatching data messages (i.e. movie segments). Control message line 72 comprises a control memory interface module 76 and dynamic random access memory (DRAM) 78. Each data message line 74 includes a data buffer interface module 80 and a DRAM 82. Data buffer interface module 80 further connects to a plurality of device interfaces 84, 86, etc. which, in turn, provide interfaces with associated disk drives 88, 90, etc. If the node includes ATM interface capability, ATM interface module 92 is included which enables up to four concurrent channels to be connected to the node for delivery of movie segments.

The architecture of multi-node network 10 is configured to efficiently handle both long data messages that are consistent with relatively long movie segments (e.g. five minutes) and a multiplicity of small control messages which are required to enable operation of video server 10 and the individual nodes. Within each node, the respective control and data message lines 72, 74 segregate control and data messages and allow independent processing and transfer thereof to an input/output (I/O) switch 94. I/O switch 94 includes apparatus which enables it to independently switch messages that arrive on one or more of input links 96 from nodes that are one link distant. Each node is preferably provided with approximately twice as many communication links 96 as data and control message lines so as to provide each node with approximately twice the communications bandwidth that is present within the node.

Each communication link 96 connects to another node and enables messages to be directly routed to a connected node or to be routed through a connected node to another node, as the case may be. I/O switch 94 is further able to select, dynamically, a best communication link 96 given a current state of the various links. Each communication link 96 is independent and is usable for either data or control messages.

The architecture of the node shown in FIG. 3 enables video server 10 to provide a distributed server function wherein all messages switching actions are distributed throughout the nodes. This architecture eliminates any need for centralized switching control and it is only within a node that control and data messages are segregated and handled independently.

Figure 4:
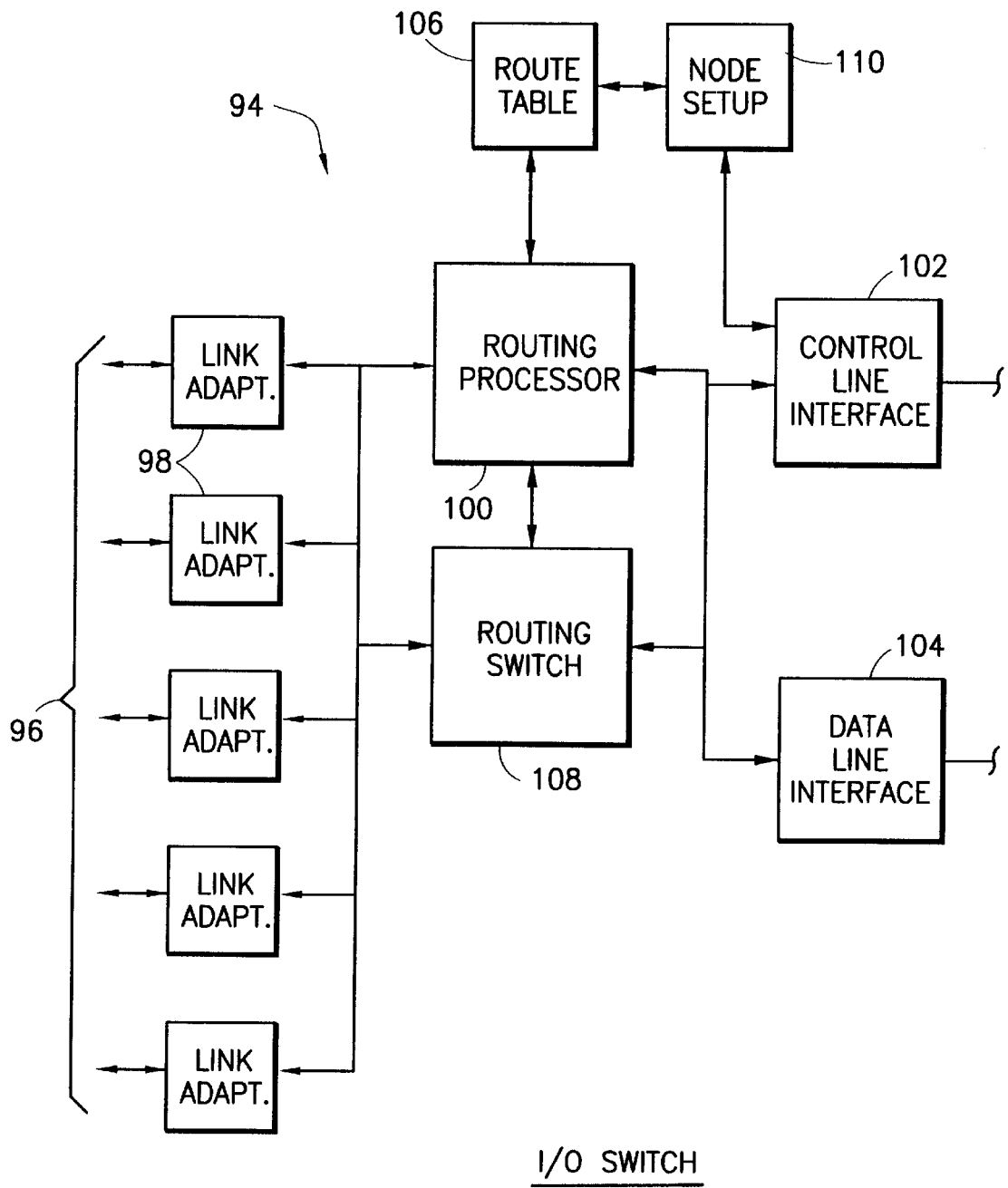
FIG. 4 is a block diagram of modular components of the I/O switch shown in FIG. 3.

In FIG. 4, a block diagram illustrates further details of I/O switch 94. Each of communication links 96 is bidirectional and interfaces with a link adapter 98. Each link adapter 98 is preferably a 100 megabyte/second, full duplex transceiver that is adapted to provide an isochronous data stream. A routing processor 100, in the case of outgoing messages, accepts a destination address from either control line interface 102 or data line interface 104. In response, routing processor 100 accesses route table 106, examines the state of routing switch 108 and selects an optimal link adapter 98 for transmission of the message. I/O switch 94 further includes a node set-up circuit 110 that is employed to initialize route table 106. Route table 106 has an individual entry for every possible node address. Each node address entry further specifies a primary link adapter 98 as being the shortest path to the addressed node and three alternate link adapters, in case the primary link adapter is not available.

When either a control message appears in control line interface 102 or a data message appears in data line interface 104, routing processor 100 examines the destination address and routes the message through an available link adapter 98, in accordance with entries in route table 106. Because I/O switch 94 includes at least twice as much bandwidth as is available on the control and buffer message lines, message transfers are accomplished without undue delay. Thus, control messages are dispatched without having to wait for the completion of very long data messages.

Figure 5:
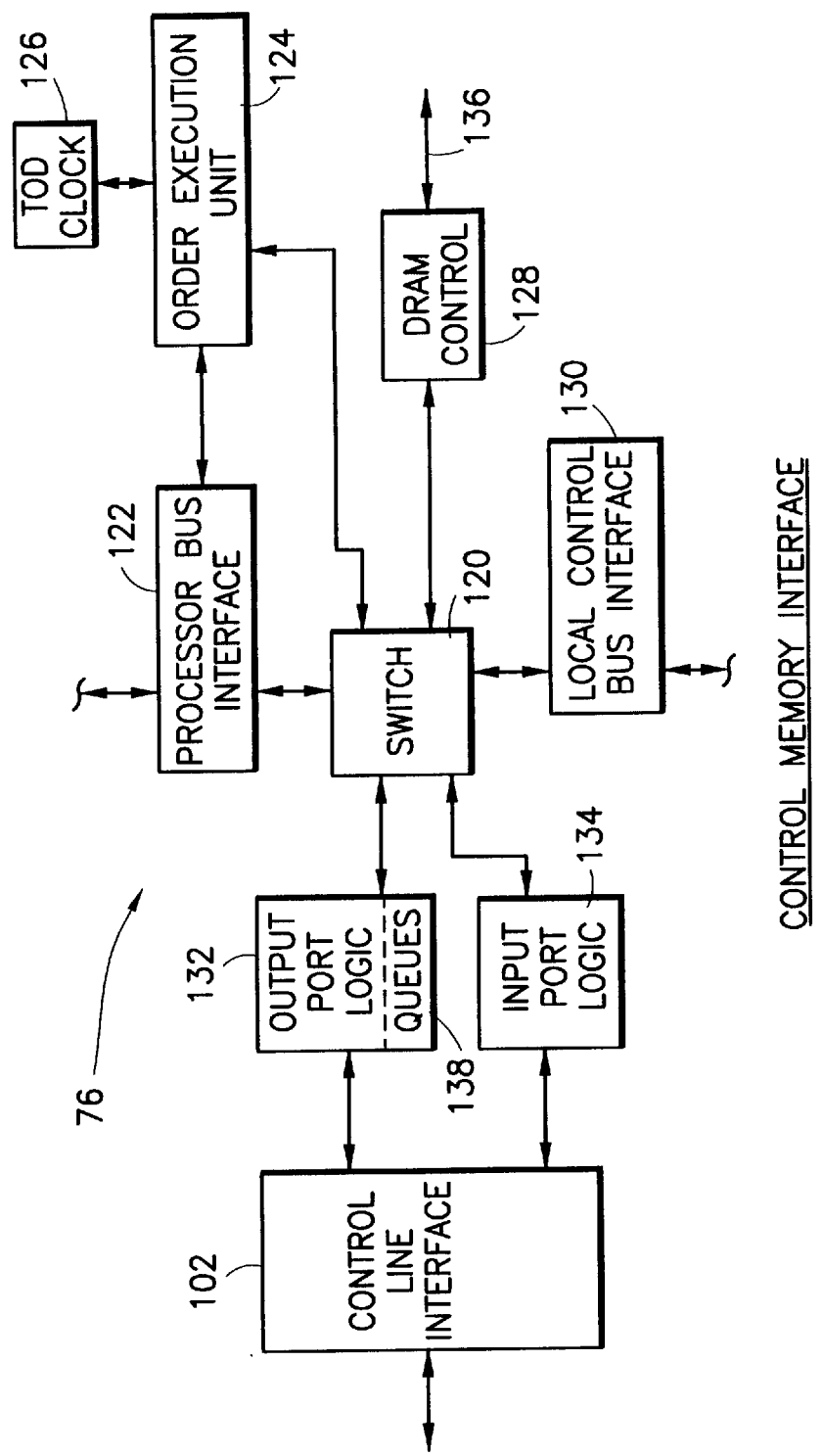
FIG. 5 is a block diagram of modular components of the control memory interface block shown in FIG. 3.

Referring to FIG. 5, details are shown of control memory interface module 76. A switch 120 enables communication between various of the functionalities within memory interface module 76. These are a processor bus interface 122, an order execution unit 124, a time of day clock 126, a DRAM controller 128, a local control bus interface 130, output port logic 132 and input port logic 134. DRAM controller 128 enables attachment of random access memory 78 via a memory bus 136. Processor bus interface 122 is interfaced to node processor 70 and provides the path that enables memory fetches and stores. Order execution unit 124 interprets, fetches and stores data to certain memory registers, as orders to be executed. Order execution unit 124 is thus a hardware unit which enables extremely rapid execution of certain system orders and operates without direct intervention of node processor 70.

Local control bus interface 130 enables access between node processor 70 and buffer interface 80 (see FIG. 3), the various device interfaces 84, 86 and ATM interface 92. Node processor 70, via local control bus 130 is able to perform a number of functions, i.e., fetch and store to data memory 82, issuance of orders to one or more device interfaces 84, 86 and ATM interface 92, transfer of data from control message line 72 to data message line 74 and vice versa, etc.

Output port logic 132 includes a plurality of queues 138 wherein messages of various levels of priority are queued, awaiting transmission. Input port logic 134 receives control messages from control line interface 102 and briefly buffers them. The control messages are decoded as to whether they are hardware executed in order execution unit 124 or require a processor interrupt for execution. Thereafter, the decoded messages are forwarded for execution.

Figure 6:
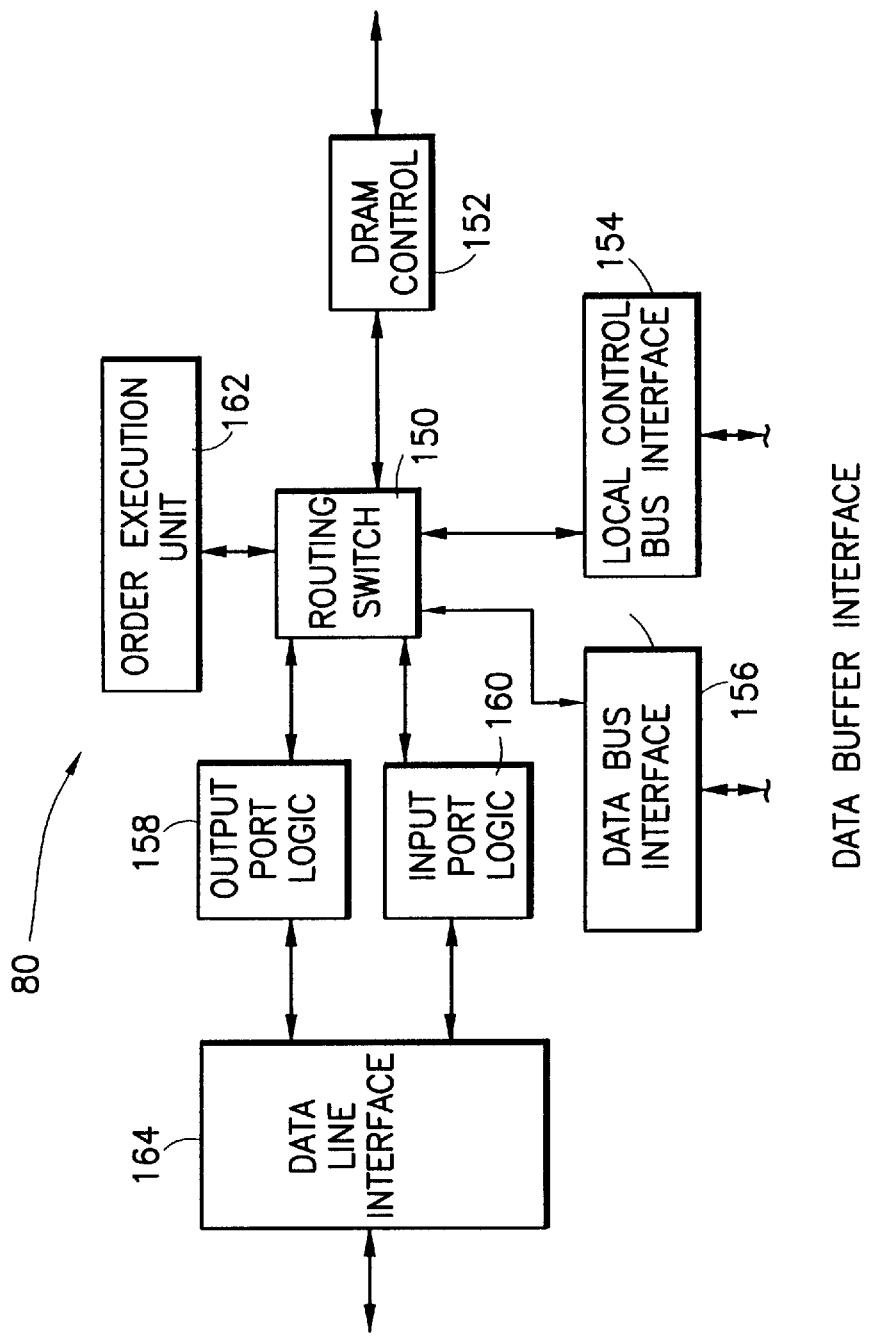
FIG. 6 is a block diagram of modular components of the data buffer interface block shown in FIG. 3.

Referring to FIG. 6, details of data buffer interface module 80 will be described. Structurally, it is similar to control memory interface module 76 and is constructed around a routing switch 150 which enables communication between the various connected functionalities. A DRAM controller 152 enables access to DRAM 82. A local control bus interface 154 interconnects to control memory interface module 76 to enable receive and transfer of control messages. Data bus interface 156 enables access to and from device interface modules 84, 86 and ATM interface 92. Output port logic module 158 and input port logic module 160 are constructed in much the same fashion as the output/input port logic modules of memory interface 76, however, the data structures processed therein are more complex. Order execution unit 162 executes hardware executed messages related to data message line functions. Data line interface 164 provides an interface to control buffer line interface 104 of I/O switch 94 (see FIG. 4).

As a result of the above described architecture, control messages and long data messages are handled substantially independently. This enables the data messages to be queued and transmitted isochronously while control messages are processed and readied for transmission in a concurrent fashion. As a result, there is no need to preempt the processing and/or transmission of long data messages for control messages.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A video server system including plural nodes and N bidirectional links connecting each node to N other nodes, each link enabling bidirectional inter-node communications, comprising:

disk storage means associated with a first node for storing at least a portion of a video presentation in plural data blocks, each data block storing data corresponding to a viewing time segment of said video presentation;

random access buffer means in a second node for storing data blocks of said video presentation received from said disk storage means in said first node, upon an initial request by a first viewing terminal to view said video presentation;

communication means in said second node for providing said data block as an output to enable receipt thereof by viewing terminals coupled to said communication means; and control means coupled to nodes in said system for receiving requests from viewing terminals for said video presentation, said control means causing said communication means in said second node to couple to said first viewing terminal which renders said initial request and to couple to additional viewing terminals which render requests to view said video presentation within a time period from said initial request, said time period not exceeding a sum of viewing times for data blocks stored in said random access buffer means, said control means causing said data blocks to be supplied from said random access buffer means to both said first viewing terminal and said additional viewing terminals; and wherein said control means contains a listing of plural nodes to be sequentially assigned to supply an audiovisual presentation, said plural nodes arranged so that each node to be next assigned to supply said audiovisual presentation is positioned no more than one link distant from an immediately preceding assigned node which provides said audiovisual presentation, said control means assigning a succeeding node to provide said audiovisual presentation when a previously assigned node has no further capacity to respond to additional requests for said audiovisual presentation.

2. The video server system as recited in claim 1, wherein said communication means provides said data blocks as an isochronous data flow to coupled viewing terminals.

3. The video server system as recited in claim 1, wherein data blocks comprising viewing time segments of said audiovisual presentation are stored in disk storage means associated with plural nodes, each node of said plural nodes being an originating node for data blocks comprising a segment stored in an associated disk storage means, an originating node including first table means that identifies where all said data blocks are stored.

4. The video server system as recited in claim 3, wherein each node includes second table means identifying audiovisual presentation viewing segments and an identification of an originating node for each said audiovisual presentation viewing segment.

5. The video server system as recited in claim 4, wherein each node that provides data blocks of an audiovisual presentation to viewing terminals provides messages to an originating node of said data blocks, said messages updating said first table means in said originating node regarding whereabouts of said data blocks.

* * * * *